United States Patent [19]
Kawaguchi et al.

[11] 3,887,899
[45] June 3, 1975

[54] DUAL BRAKE SYSTEM FAULT DETECTION DEVICE

[75] Inventors: Hiroshi Kawaguchi; Kiyoshi Nishiwaki, both of Shizuoka-ken, Japan

[73] Assignee: Toyota Jidosha Kogyo Kabushiki Kaisha, Japan

[22] Filed: Apr. 24, 1974

[21] Appl. No.: 463,689

[30] Foreign Application Priority Data
June 21, 1973  Japan................................ 48-69178

[52] U.S. Cl.................. 340/52 C; 60/534; 188/1 A; 188/151 A; 340/60
[51] Int. Cl......................... B60t 8/26; B60t 17/22
[58] Field of Search.......... 340/52 B, 52 C, 60, 240, 340/242; 200/82 D; 188/1 A, 151 A; 60/534; 303/6 C, 84 A

[56] References Cited
UNITED STATES PATENTS

| | | | |
|---|---|---|---|
| 3,090,848 | 5/1963 | Scholz | 340/52 C |
| 3,427,582 | 2/1969 | Brandon, Jr. | 340/52 C |
| 3,549,837 | 12/1970 | Barnes et al. | 200/82 D |
| 3,708,211 | 1/1973 | Bueler | 340/52 C |
| 3,712,683 | 1/1973 | Keady et al. | 340/52 C |

Primary Examiner—John W. Caldwell
Assistant Examiner—Joseph E. Nowicki
Attorney, Agent, or Firm—Toren, McGeady and Stanger

[57] ABSTRACT

A fault detection device for a dual brake system comprises pressure sensing means operative to generate a signal indicating trouble in the brake system in response to pressure conditions arising as a result of a fault in said system. The sensing means comprise a pair of pressure switches, with one of the switches being arranged to sense a predetermined pressure level in the rear master cylinder of the system and with the other pressure switch being arranged to sense a predetermined level of imbalance between the pressures in the rear master cylinder and the rear wheel cylinders. Upon occurrence of a predetermined set of pressure conditions sensed by the pressure switches, switch means responsive to the sensing means are actuated to generate a warning signal indicating a fault in the system.

4 Claims, 4 Drawing Figures

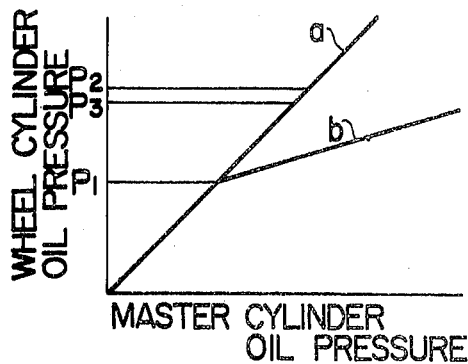
FIG. 1
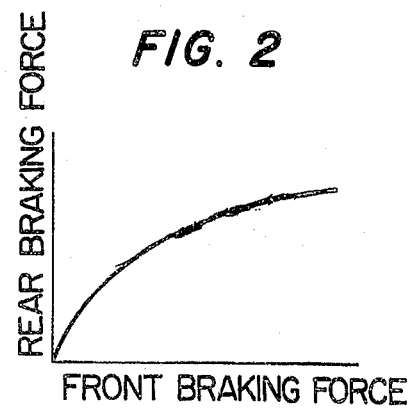
FIG. 2
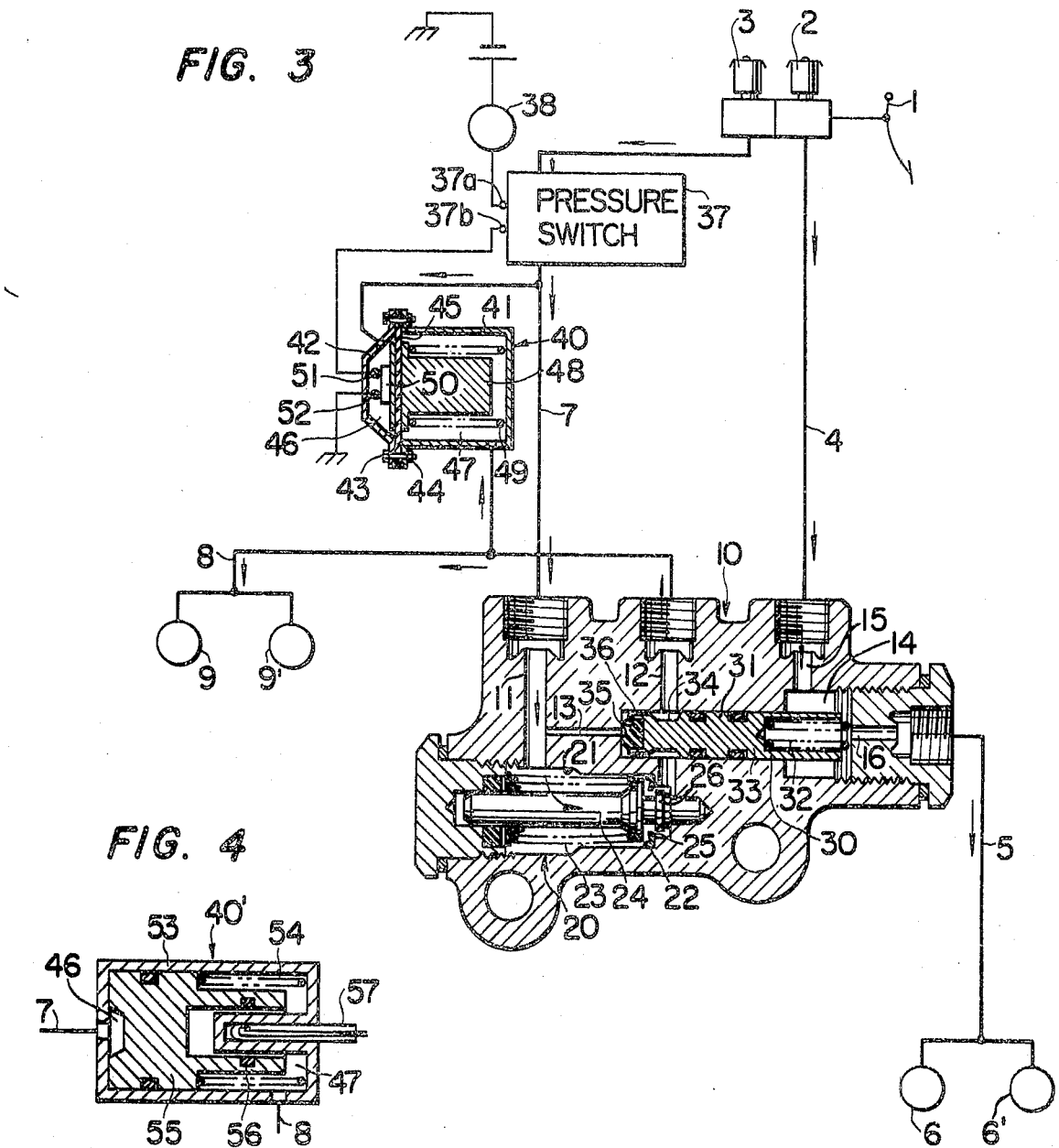
FIG. 3
FIG. 4

DUAL BRAKE SYSTEM FAULT DETECTION DEVICE

BACKGROUND OF THE INVENTION

The present invention relates to a fault or failure sensing device in a hydraulic service system for vehicles such as automobiles, particularly in a dual brake system in which the brake system for the front wheels and that for rear wheels are provided operatively independently of each other.

In order to obtain secure and reliable braking performance to cope with higher automobile speeds and aggravated traffic conditions, there has been developed and practically utilized a so-called dual brake system in which the hydraulic service brake system of the vehicle is divided into a front brake system for the front wheels and a rear brake system for the rear wheels, with both systems being arranged to be operatively independent of each other so as to prevent all of the wheel brakes from becoming inoperative at the same time in the event of trouble in the system, such as oil leakage in a part of the oil pressure circuit. Such a dual brake system is also provided with a regulating valve adapted to distribute braking force to further insure vehicle stability when brakes are applied. Additionally, a by-pass valve is provided for increasing rear braking force when the front brake system fails.

However, an inherent problem in such a system resides in the fact that the faults in the valves themselves usually remain unnoticed when the vehicle is at a standstill. Such faults are only first detected when the running vehicle is braked as a result of an abnormality which becomes evident in the braking effect. However, discovering trouble at this time is usually too late, and sometimes serious accidents result.

In order to avoid these problems, the present invention proposes utilization of a device which is capable of sensing and signaling trouble, if any, occurring in the entire brake system including the aforementioned valves even when the vehicle is at a standstill. By electrically detecting the brake oil pressure condition in each brake system as well as the condition of oil pressure adjustment effected by the regulating valve, a fault may be sensed and a signal indicative thereof may be generated.

SUMMARY OF THE INVENTION

Briefly, the present invention may be described as a fault-detecting device for a dual brake system which includes front and rear master cylinders and front and rear wheel cylinders, with brake actuating means, such a brake foot pedal, operating to apply braking fluid pressure developed in the master cylinders to the respective wheel cylinders in order to brake the vehicle. The system includes a regulating valve which permits fluid pressure in the front and rear wheel cylinders to rise linearly in a one-to-one ratio relative to the fluid pressure in the master cylinders until a particular predetermined pressure level is reached. At such point, the development of fluid pressure in the rear wheel cylinder occurs at a reduced rate relative to the rear master cylinder pressure. The device of the present invention comprises sensing means including a pair of pressure-sensitive devices, with one of said devices being connected in the system to sense the pressure in the rear master cylinder in order to close a signal generating circuit when said rear master cylinder pressure exceeds a predetermined level, and with the other of said pressure-sensitive devices being connected to close the signal circuit when the relative difference between rear master cylinder pressure and rear wheel cylinder pressure is relatively small or below a predetermined level. The pair of pressure-sensing devices are connected in series within the signal circuit and operate to generate a fault signal when both the pressure-sensitive devices are in a position to close the signal circuit.

In one aspect of the invention the pressure-sensitive device connected to sense the pressure differences between the rear master cylinder and rear wheel cylinders is formed with a housing having a flexible diaphragm connected therein to define a pair of pressure chambers, one of said chambers being connected with the rear master cylinder and the other being connected with the rear wheel cylinders. The pressure imbalance between the chambers causes the diaphragm to flex thereby opening the signal circuit of the device.

Alternatively, this pressure-sensing device may comprise a pressure piston mounted within a cylinder and having a magnet thereon operating to open or close a reed switch. Pressure imbalance causing the piston to move within the cylinder will operate to open or close the signal circuit by controlling operation of the reed switch.

The various features of novelty which characterize the invention are pointed out with particularity in the claims annexed to and forming a part of this disclosure. For a better understanding of the invention, its operating advantages and specific objects attained by it use, reference should be had to the accompanying drawings and description matter in which there are illustrated and described preferred embodiments of the invention.

BRIEF DESCRIPTION OF THE DRAWING

In the Drawings

FIG. 1 is a graph showing the relationship between wheel cylinder oil pressure and master cylinder oil pressure;

FIG. 2 is a graph showing the relationship between front braking force and rear braking force;

FIG. 3 is a schematic diagram with parts in section showing a system embodying the present invention as adapted in a dual brake system; and FIG. 4 is sectional view of another embodiment of a pressure switch according to the present invention.

DETAILED DESCRIPTION OF THE INVENTION

FIG. 1 shows the relationship between master cylinder oil pressure and wheel cylinder oil pressure in a vehicle brake system such as that with which the invention may be utilized. It will be noted that, in the front brake system, wheel cylinder oil pressure rises at a linear rate of 1 : 1 with master cylinder oil pressure as indicated by line $a$. However, in the rear brake system, wheel cylinder oil pressure increases linearly at the same rate as master cylinder oil pressure up to a certain level. Upon reaching such level, the rise of wheel cylinder oil pressure is suppressed by a regulating valve and occurs at a reduced rate as shown by curve $b$. Thus, when braking force increases, it is distributed such that the front braking force will become greater than the rear braking force in the manner shown in FIG. 2.

A dual brake system having such braking oil pressure control is described in detail with reference to FIG. 3.

It will be seen that a front cylinder 2 and a rear master cylinder 3 are connected in tandem to a brake pedal 1 such that an equal amount of master cylinder oil pressure will be produced in both cylinders at a rate corresponding to the force applied on the pedal 1. The front master cylinder 2 is connected through a conduit 4, a valve assembly 10 and a conduit 5 to a pair of front wheel cylinders 6, 6' to supply front braking oil pressure thereto. The rear master cylinder 3 is similarly connected through a conduit 7, valve assembly 10 and a conduit 8 to a pair of rear wheel cylinders 9, 9' to supply rear braking oil pressure thereto. The valve assembly 10 comprises an integral structure including a regulating valve 20 provided between a passage 11 connected to the conduit 7 on the rear master cylinder side and a passage 12 connected to the conduit 8 on the rear wheel cylinder side, with a by-pass valve 30 being provided between the passage 12 and a passage 13 branching off from the passage 11. The conduit 4 on the front master cylinder side and the conduit 5 on the front wheel cylinder side are connected to an oil pressure chamber 14 on the operating side of the by-pass valve 30 through passages 15 and 16, respectively. The regulating valve 20 consists of a cylinder 21 provided between and in communication with said passages 11 and 12, a valve seat 22 disposed in said cylinder on its side closer to the passage 12, a piston 24 inserted movably in the cylinder 21 with a spring 23 being loaded on one side thereof, and a valve body 26 secured to said piston 24 for changing the area of an opening 25 provided in the valve seat 22, whereby the valve 20 is adapted to change the rate of rise of wheel cylinder oil pressure.

The by-pass valve 30 consists of a cylinder 31 provided between and in communication with the passages 12, 13, an oil pressure chamber 14, a piston 33 inserted movably in the cylinder 31 with a spring 32 being loaded on one side thereof, a recess 34 provided at a location on the piston 33 corresponding to the passage 12 for allowing passage of rear braking oil pressure therethrough, and a valve body 36 mounted at the end of the piston 33 and operative through the medium of seal packing 35 to open or close the by-pass passage 13. The valve 30 functions to communicate the by-pass passage 13 with the passage 12 when a regulated amount of front wheel cylinder oil pressure is not produced in the oil pressure chamber 14.

This, in normal braking operation, master cylinder oil presure from the reat master cylinder 3 is supplied to the rear wheel cylinder 9, 9' through conduit 7, passage 11, regulating valve 20, passage 12 and conduit 8, and if wheel cylinder oil pressure is low, the piston 24 is forced to move to the right by the force of spring 23 in the valve 20, allowing the valve body 26 to fully open the opening 25 in the valve seat 22 so that wheel cylinder oil pressure rises at the rate of 1 : 1 with master cylinder oil pressure. However, when wheel cylinder oil pressure reaches a value as, for example, indicated by $P_1$ in FIG. 1, the piston 24 will be urged to move to the left under the force of wheel cylinder oil pressure acting upon the valve body 26, thereby causing a corresponding reduction of the open flow area of the opening 25. Thus, after this time, the rate of rise of wheel cylinder oil pressure relative to master cylinder oil pressure decreases as shown by curve b in FIG. 1.

In the front brake system, master cylinder pressure from the front master cylinder 2 is likewise supplied to the front wheel cylinders 6, 6' through conduit 4, passage 15, oil pressure chamber 14, passage 16 and conduit 5, and wheel cylinder oil pressure rises at the same rate as master cylinder oil pressure as shown by straight line a in FIG. 1. During this peroid, the piston 33 of the by-pass valve 30 is moved to the left by the combined force of the front brake oil pressure and spring 32 to keep the by-pass passage 13 closed with the valve body 36.

Should a fault arise in the front brake system to obstruct normal rise of wheel cylinder oil pressure, piston 33 of the by-pass valve 30 will be moved to the right under the force of rear master cylinder oil pressure in the by-pass passage 13 to apply such oil pressure directly into the passage 12. Thereby, rear wheel cylinder oil pressure will be equalized with master cylinder oil pressure inasmuch as it will not be regulated by the regulating valve 20.

The fault-sensing device of the present invention is incorporated in a dual brake system such as described above. As shown in FIG. 3 a pressure switch 37 is provided in the conduit 7, and another pressure switch 40 is provided between the conduits 7 and 8 in parallel with the regulating valve 20. Both switches 37 and 40 are connected in series in an electrical circuit between a power source and an alarm lamp 38.

The pressure switch 37 is controlled to be turned on or off by sensing braking oil pressure in the conduit 7. When the brakes are off, or even when the brakes are applied, if master cylinder oil pressure in the rear master cylinder 3 is lower than a value $P_2$ which is greater than the pressure control starting oil pressure $P_1$ for the regulating valve 20, both terminals 37a and 37b of the switch 37 remain open. However, when master cylinder oil pressure exceeds the valve $P_2$, the terminals 37a and 37b are connected to each other to form a closed circuit path therebetween.

A second pressure switch 40 including a diaphragm 45 mounted between a case 41 and a cover 42 by means of bolts 43 and nuts 44 to define two oil pressure chambers 46 and 47 is provided, with one of said chambers 46 being connected to the conduit 7 on the master cylinder side and the other chamber 47 being connected to the conduit 8 on the wheel cylinder side. Mounted centrally of the diaphragm 45 is a receiving member 48 movable in accordance with flexure of said diaphragm, with a return spring 49 being interposed between the receiving member 48 and the case 41 on the side of the oil pressure chamber 47. Secured to the receiving member 48 in the chamber 46 is an electron-conductive connecting plate 50 arranged to close a circuit path between two contacts 51 and 52.

When the difference between master cylinder oil pressure in the chamber 46 and wheel cylinder oil pressure in the chamber 47 is small, the diaphragm 45 will not flex and it will stay in its leftmost position to close the circuit path between the contacts 51, 52. However, when master cylinder oil pressure reaches a value $P_3$ which is almost equal to the oil pressure $P_2$ which starts operation of the switch 37, the diaphragm 45 will be deflected to the right due to the increased difference between master cylinder oil pressure and regulated wheel cylinder oil pressure thereby to separate the connecting plate 50 from the contacts 51, 52.

Therefore, when the rear brake system is operating normally with the valves 20 and 30, the terminals 37a and 37b of the pressure switch 37 are brought into contact to form a closed circuit path therebetween, while the contacts 51, 52 of the pressure switch 40 are brought into the open or separated position from the connected condition when master cylinder oil pressure reaches the value $P_3$ substantially equal to the value $P_2$. Accordingly, switches 37 and 40 will not be brought into the connected condition simultaneously and hence the alarm lamp 38 will not be lighted.

However, if a regulated value of wheel cylinder oil pressure is not produced due to failure of the regulating valve 20 or if wheel cylinder oil pressure and master cylinder oil pressure become equal to each other with the by-pass passage 13 being opened due to trouble therein, even though the front brake system operates normally, the contacts 51, 52 of the pressure switch 40 remain connected even after master cylinder oil pressure has reached the value $P_3$, thus keeping the alarm lamp 38 lighted to signal the occurrence of trouble.

Referring to FIG. 4, there is shown a modified pressure switch 40'. In this embodiment, a piston 55 loaded with a spring 54 at one end is movably inserted in a cylinder 53, and formed on both sides of piston 55 are oil pressure chambers 46 and 47 connected to conduits 7 and 8, respectively. Mounted on the piston 55 is a permanent magnet 56 adapted to open a normally connected reed switch 57 when the piston 55 is moved through a certain amount of its stroke due to pressure difference between the oil pressure chambers 46 and 47. Thus, it will be seen that the switch 40' will operate in essentially the same manner as the switch 40 in response to the pressure levels existing in the chambers 46 and 47.

Alternatively if the oil pressure chamber 46 in the switches 40 or 40' is connected to the conduits 4 or 5 in the front brake system, trouble in this system causing either abnormal rise or no rise in braking oil pressure can be also detected.

As apparent from the foregoing description, if the device of the present invention is adapted in the dual brake system of a vehicle, the operator or driver can easily detect trouble, if any, in the regulating valve 20 and/or in the bypass valve 30 by merely stepping on the brake pedal to produce a braking oil pressure with the vehicle at a standstill. Thus, it will be seen that present device contributes greatly to vehicle driving safety because faults may be detected before the vehicle is placed in operation.

While specific embodiments of the invention have been shown and described in detail to illustrate the application of the inventive principles, it will be understood that the invention may be embodied otherwise without departing from such principles.

What is claimed is:

1. A fault detecting device for a vehicle dual brake system having brake actuating means, a front brake system including a front master cylinder and front wheel cylinders, a rear brake system including a rear master cylinder and rear wheel cylinders, conduit means operatively connecting said master cylinders to apply braking fluid pressure to said wheel cylinders to brake said vehicle in response to operation of said actuating means, and regulating valve means provided in said rear brake system for regulating the braking fluid pressure applied in said rear wheel cylinders, said fault detection device comprising an alarm circuit including signal means for providing an indication of a fault in said system upon actuation of said circuit, first and second pressure-sensitive switches each operatively associated with said alarm circuit and adapted to be switched between a circuit activating condition and a circuit deactivating condition in response to pressure applied thereto, said first pressure-sensitive switch being connected to sense pressure in said rear master cylinder and to switch to said circuit-activating condition when said rear master cylinder pressure reaches a predetermined level, said second pressure-sensitive switch being connected to sense a difference between master cylinder pressure and wheel cylinder pressure and switch to said circuit deactivating condition when the sensed difference reaches a predetermined level, said alarm circuit being operative to generate a fault-indicating signal when both said switches are in the circuit-activating condition.

2. A device according to claim 1 wherein said second pressure-sensitive switch is connected to sense the difference between the rear master cylinder pressure and rear wheel cylinder pressure.

3. A device according to claim 1 wherein said second pressure-sensitive switch comprises a case having a diaphragm mounted therein to separate the interior of said case into a pair of pressure chambers, said diaphragm being resiliently movable in response to pressure in each of said chambers, alarm circuit control means mounted to move with said diaphragm between a circuit-activating and a circuit-deactivating condition, and spring means biasing said diaphragm towards said circuit-activating condition with a spring force adapted to be overcome by a predetermined level of pressure difference between said chambers.

4. A device according to claim 1 wherein said second pressure-sensitive switch comprises piston means, means defining a pressure cylinder having said piston means movably mounted therein, said cylinder being arranged to define a pair of pressure chambers one on each side of said piston with said piston being arranged to move in response to pressure within said chambers, a reed switch operatively associated with said alarm circuit and adapted to be switched between a circuit-activating and a circuit-deactivating condition, magnet means mounted upon said piston and movable therewith relative to said reed switch to effect switching thereof, and spring means biasing said piston in one direction with a spring force adapted to be overcome by a predetermined level of pressure difference between said chambers.

* * * * *